(12) United States Patent
McLean et al.

(10) Patent No.: US 8,286,464 B2
(45) Date of Patent: Oct. 16, 2012

(54) SENSING DEVICE AND METHODS RELATED THERETO

(75) Inventors: Gerard F McLean, West Vancouver (CA); Mark Petersen, North Vancouver (CA); Clement Fortin, Vancouver (CA); Joerg Zimmerman, Vancouver (CA)

(73) Assignee: Societe BIC, Clichy (FR)

( * ) Notice: Subject to any disclaimer, the term of this patent is extended or adjusted under 35 U.S.C. 154(b) by 803 days.

(21) Appl. No.: 12/144,619

(22) Filed: Jun. 23, 2008

(65) Prior Publication Data

US 2009/0007705 A1    Jan. 8, 2009

Related U.S. Application Data

(63) Continuation-in-part of application No. 11/644,999, filed on Dec. 22, 2006.

(30) Foreign Application Priority Data

Dec. 21, 2007    (WO) ................ PCT/CA2007/002350

(51) Int. Cl.
*G01F 23/00* (2006.01)
*G01N 21/41* (2006.01)

(52) U.S. Cl. ............. 73/53.01; 73/23.2; 73/232; 73/262

(58) Field of Classification Search ................... 73/49.3, 73/53.01, 232, 262
See application file for complete search history.

(56) References Cited

U.S. PATENT DOCUMENTS

| | | | |
|---|---|---|---|
| 3,688,187 A | 8/1972 | Loos | |
| 4,165,641 A | 8/1979 | Pomerantz et al. | |
| 4,447,743 A | 5/1984 | Bean et al. | |
| 5,005,407 A | 4/1991 | Koon | |
| 5,249,454 A * | 10/1993 | Kollie et al. | 73/49.3 |
| 5,287,729 A * | 2/1994 | Lehmann | 73/49.3 |
| 5,537,858 A * | 7/1996 | Bauer | 73/49.3 |
| 5,590,197 A | 12/1996 | Chen et al. | |
| 5,816,224 A | 10/1998 | Welsh et al. | |
| 5,859,365 A | 1/1999 | Kataoka et al. | |
| 5,991,400 A | 11/1999 | Kamperman | |
| 6,105,134 A | 8/2000 | Pinder et al. | |
| 6,155,099 A | 12/2000 | Kobayashi et al. | |
| 6,227,041 B1 * | 5/2001 | Collins et al. | 73/76 |
| 6,254,748 B1 | 7/2001 | Surampudi et al. | |
| 6,285,179 B1 | 9/2001 | Kubo et al. | |
| 6,306,285 B1 | 10/2001 | Narayanan et al. | |
| 6,327,652 B1 | 12/2001 | England et al. | |

(Continued)

FOREIGN PATENT DOCUMENTS

CN    1551977    12/2004

(Continued)

OTHER PUBLICATIONS

"International Application Serial No. PCT/CA2007/002350, International Search Report mailed Apr. 25, 2008", 3 pgs.

(Continued)

*Primary Examiner* — Daniel Larkin
(74) *Attorney, Agent, or Firm* — The H.T. Than Law Group

(57) ABSTRACT

Embodiments of the invention relate to a device for a fluid enclosure. The device includes a sensing device that responds to a change in distance relative to a fluid enclosure. The change in distance is a function of at least one dimension of the fluid enclosure.

49 Claims, 9 Drawing Sheets

U.S. PATENT DOCUMENTS

| | | | |
|---|---|---|---|
| 6,429,242 | B1 | 8/2002 | Macher et al. |
| 6,447,945 | B1 | 9/2002 | Streckert et al. |
| 6,502,461 | B2 | 1/2003 | Keller |
| 6,584,825 | B2 * | 7/2003 | Pratt et al. ............... 73/23.2 |
| 6,588,458 | B2 | 7/2003 | Rodgers |
| 6,589,679 | B1 | 7/2003 | Acker et al. |
| 6,610,433 | B1 | 8/2003 | Herdeg et al. |
| 6,641,240 | B2 | 11/2003 | Hsu et al. |
| 6,804,357 | B1 | 10/2004 | Ikonen et al. |
| 6,808,833 | B2 | 10/2004 | Johnson |
| 6,869,708 | B2 | 3/2005 | Kelley et al. |
| 6,878,481 | B2 | 4/2005 | Bushong et al. |
| 7,101,512 | B2 * | 9/2006 | Hahs et al. ............... 422/554 |
| 7,117,732 | B2 | 10/2006 | Curello et al. |
| 7,563,305 | B2 | 7/2009 | Zimmermann |
| 7,708,815 | B2 | 5/2010 | Zimmermann |
| 2002/0053901 | A1 | 5/2002 | Strayer et al. |
| 2002/0197522 | A1 | 12/2002 | Lawrence et al. |
| 2003/0077491 | A1 | 4/2003 | Lillis |
| 2003/0091883 | A1 | 5/2003 | Peled et al. |
| 2003/0118881 | A1 | 6/2003 | Walsh et al. |
| 2003/0129464 | A1 | 7/2003 | Becerra et al. |
| 2003/0131663 | A1 | 7/2003 | Gore et al. |
| 2003/0134162 | A1 | 7/2003 | Gore et al. |
| 2003/0141188 | A1 | 7/2003 | Imamura et al. |
| 2003/0150655 | A1 | 8/2003 | Itou |
| 2003/0215681 | A1 | 11/2003 | Appt et al. |
| 2004/0013927 | A1 | 1/2004 | Lawrence et al. |
| 2004/0023087 | A1 * | 2/2004 | Redmond ............... 429/19 |
| 2004/0072049 | A1 | 4/2004 | Becerra et al. |
| 2004/0166388 | A1 | 8/2004 | Wheat et al. |
| 2004/0175598 | A1 | 9/2004 | Bliven et al. |
| 2004/0185314 | A1 | 9/2004 | Miyamoto et al. |
| 2004/0200735 | A1 | 10/2004 | DaCosta et al. |
| 2004/0209153 | A1 | 10/2004 | Peled et al. |
| 2004/0219398 | A1 | 11/2004 | Calhoon |
| 2004/0261525 | A1 | 12/2004 | Chen |
| 2005/0008908 | A1 | 1/2005 | Kaye et al. |
| 2005/0014041 | A1 | 1/2005 | Becerra et al. |
| 2005/0056641 | A1 | 3/2005 | Drake et al. |
| 2005/0058879 | A1 * | 3/2005 | Guay ............... 429/38 |
| 2005/0236591 | A1 * | 10/2005 | Wirthlin ............... 250/577 |
| 2006/0166045 | A1 | 7/2006 | Ryoichi |
| 2007/0186662 | A1 | 8/2007 | Linglin et al. |
| 2007/0251822 | A1 * | 11/2007 | Hoagland et al. ............... 204/424 |
| 2008/1015295 | | 6/2008 | McLean |
| 2010/0255873 | A1 | 10/2010 | Peled et al. |

FOREIGN PATENT DOCUMENTS

| | | | |
|---|---|---|---|
| DE | 10046102 | | 3/2002 |
| DE | 10046102 A1 | | 3/2002 |
| DE | 10109058 | * | 9/2002 |
| GB | 2064125 A | | 6/1981 |
| JP | 3089145 | | 4/1991 |
| JP | 8-35821 A | * | 2/1996 |
| WO | WO-03008916 A1 | | 11/2003 |
| WO | WO-2008077252 A1 | | 7/2008 |

OTHER PUBLICATIONS

"International Application Serial No. PCT/CA2007/002350, Written Opinion mailed Apr. 25, 2008", 4 pgs.

"Chinese Application Serial No. 200780051334,X, First Office Action mailed Jun. 13, 2010", (w// English Translation), 12 pgs.

"Chinese Application Serial No 200780051334.X, Office Action Response Filed Oct. 28, 2010", 9 pg.

"Singapore Application Serial No. 200904275-5, Office Action Response Filed Nov. 26, 2010", 11 pgs.

"Singapore Application Serial No. 200904275-5, Office Action mailed Mar. 18, 2011", 10 Pgs.

AO, B. Y, et al., "A Study on Wall Stresses Indeced by LaNi5 Alloy Aydrogen Absorption-Desorption Cycles", Journal fo Alloys and Compounds vol. 390, (2005), pp. 122-126.

Heung, "Using Metal Hydride to Story Hydrogen", WSRC-MC, (2003), pp. 1-8.

"U.S. Appl. No. 11/644,999, Response filed Sep. 9, 2011 to Non Final Office Action mailed Jun. 10, 2011", 14 pgs.

"U.S. Appl. No. 11/644,999, Final Office Action mailed Nov. 1, 2011", 14 pgs.

Kester, Walt, "Practical Design Techniques for Sensor Signal Conditioning", Analog Devices, Inc., 1999, pp. 6.1-6.9.

* cited by examiner

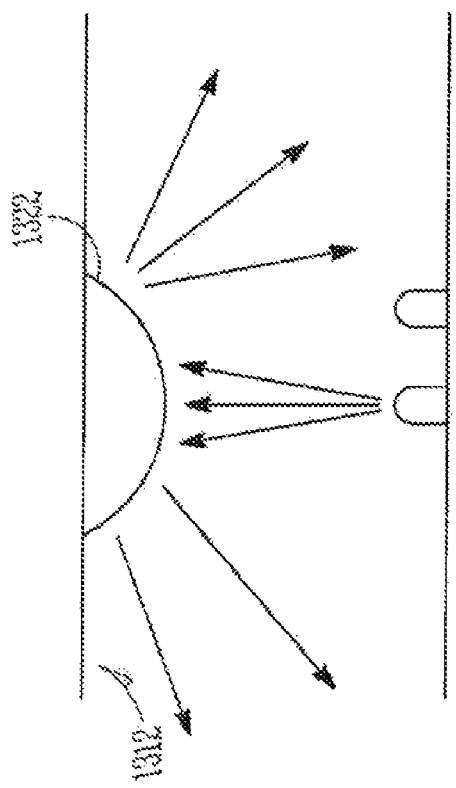
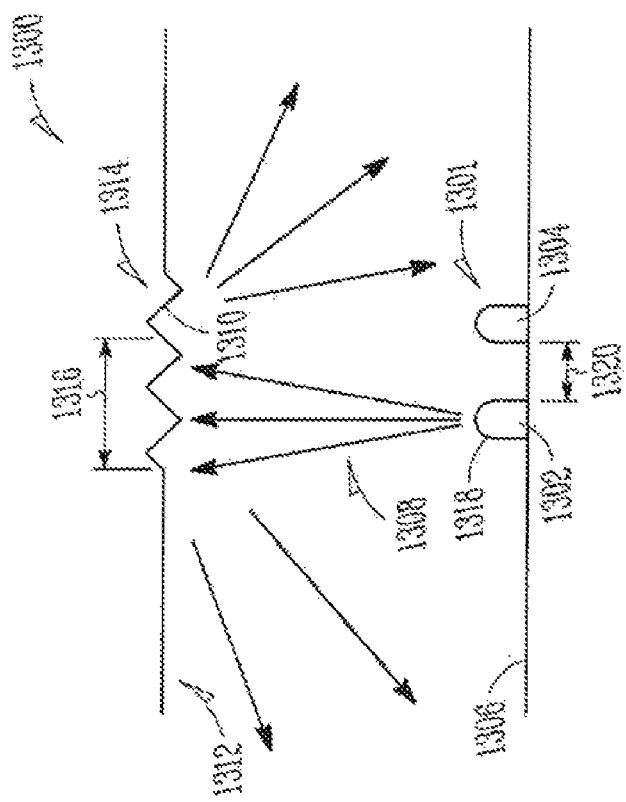

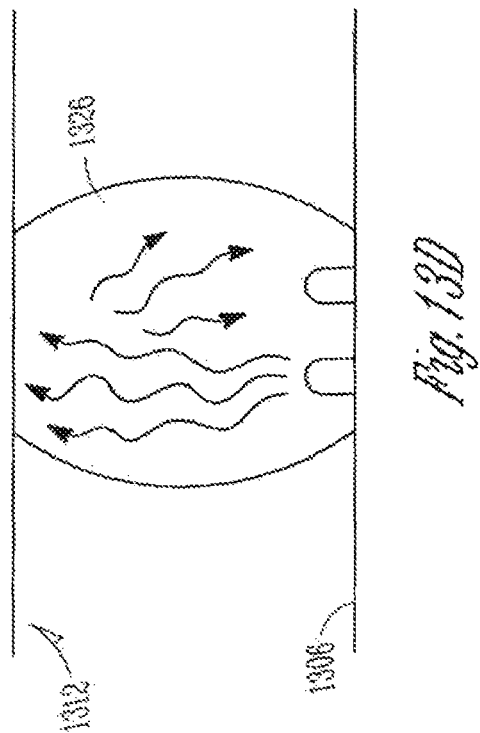
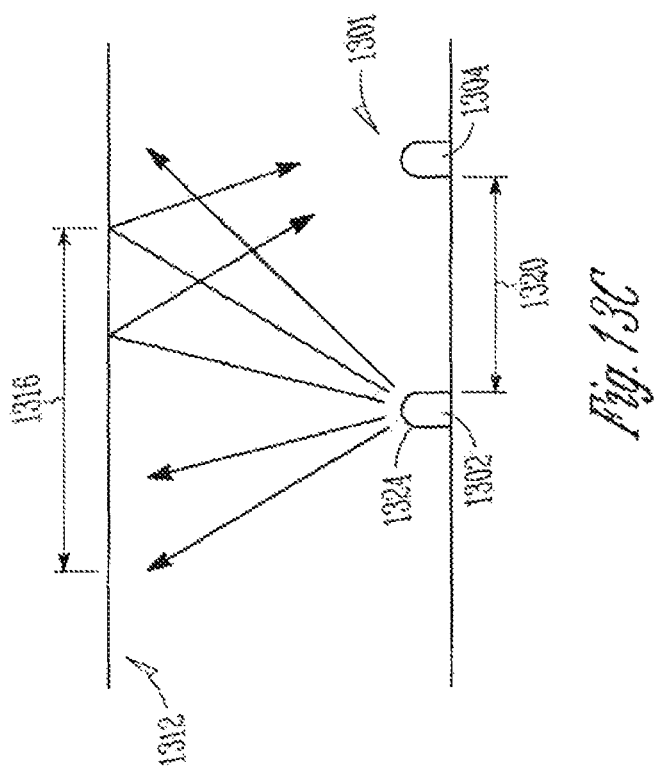

SENSING DEVICE AND METHODS RELATED THERETO

PRIORITY OF INVENTION

This continuation-in-part application claims the benefit of priority under 35 U.S.C. §119(e) to U.S. patent application Ser. No. 11/644,999, filed Dec. 22, 2006, which is herein incorporated by reference.

BACKGROUND

Systems using consumable fluids often rely on intermittent storage in fluid enclosures. State conditions of a fluid enclosure, such as the state of charge, provide information to predict and assess the needs of the system responsive to fluid exchange with the fluid enclosure. For example, in systems using replaceable or refillable fluid enclosures, state conditions can be used to predict the amount of operating time left before the consumable fluid supply may be depleted.

Often, sensing components or system peripherals for determining state conditions are in physical or mechanical contact with the enclosure. However, removal or replacement of fluid enclosures from systems using contact-based sensing may be cumbersome. In addition, the accuracy of state condition measurements and the lifetime of contact-based sensing devices may be compromised when used for fluid enclosures that are exposed to abrasive environments.

One example of a fluid enclosure utilizes metal hydrides for hydrogen storage. Metal hydride fuel storage systems are attractive candidates for use as refillable fluid enclosures to store fuels, such as hydrogen, in conjunction with fuel cells for electrochemical generation of power. However, metal hydrides undergo thermal cycles during absorption and desorption of hydrogen. As a result, determining state conditions for metal hydride systems becomes especially difficult.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIGS. 13A-D illustrate schematic views of a system including a fluid enclosure and an optical sensing device, according to some embodiments.

SUMMARY

Figure 1:
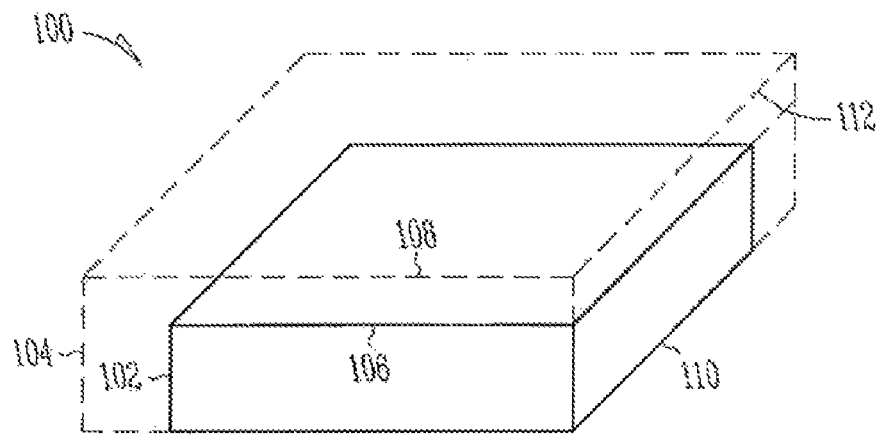
FIG. 1 illustrates a perspective view of a component and its dimensions associated with a deformation, according to some embodiments.

Embodiments of the invention relate to a device for a fluid enclosure. The device includes a sensing device that responds to a change in distance relative to a fluid enclosure. The change in distance is a function of at least one dimension of the fluid enclosure. Embodiments also relate to a fluidic system of an electronic device, including a fluid enclosure and a sensing device that responds to a change in at least one dimension of the fluid enclosure. The sensing device is at least partially enclosed within the electronic device.

Embodiments also relate to a method for monitoring a state of a fluid enclosure. The method includes responding to an observable property of a fluid enclosure, wherein the observable property is a function of the mass of a fluid in contact with the fluid enclosure.

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

In this document, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

Embodiments of the invention relate to a sensing device for a fluid enclosure. The sensing device may respond to an observable property of the fluid enclosure, such as a change in one or more dimensions. The sensing device may observe the change in distance relative to a fluid enclosure. For example, the sensing device may detect changes in distance between the sensing device and the fluid enclosure across an adjacent cavity. The sensing device may be non-contact. By not directly contacting the fluid enclosure, the device is relatively immune to strain or stress associated with the changing dimensions of the fluid enclosure in response to the varying mass of fluid in contact with the enclosure. Such stresses may be mechanical or thermal, for example. The non-contact sensing device may ease manufacturing of the system as well.

DEFINITIONS

As used herein, "sensing device" refers to a device or instrument that senses or converts a signal relating to a state condition of a fluid enclosure. The sensing device may include a charge indicator or state of charge indicator that senses or converts a signal relating to the charge of a fluid in a fluid enclosure. Transducers are an example of a charge indicator. The sensing device may also sense or convert a signal relating to a temperature or pressure of the fluid enclosure as well as a variety of other state conditions.

As used herein, "transducer" refers to a device that senses or converts one form of a signal to another. A mechanical linkage is an example of a transducer. A transducer may be digital or analog.

As used herein, "indicating" or "indicate" refers to signifying or displaying. A charge indicator may indicate or signify the state of charge of a fluid enclosure.

As used herein, "state condition" refers to a condition associated with the fluid enclosure. The state condition may include a state of charge of the fluid enclosure or fluid level, for example. The state of charge may include a mass of fluid contained within a fluid enclosure including an absolute mass of fluid, or to a mass of fluid relative to a mass of fluid contained within a fluid enclosure when said enclosure is "full" or substantially full, for example. The state condition may also include a temperature or pressure of the fluid enclosure.

As used herein, "responding" or "responds" refers to acting in reply to a stimulus. Responding may include physical, chemical or electrical reply to a stimulus, such as a deformation.

As used herein, "determine" or "determining" refers to ascertaining, such as by measuring for example. Determining may include indicating or an indication may be subsequent to a determination, for example.

As used herein, "deformation" refers to an alteration of shape. The deformation may be in any dimension, for example. A solid component, such as a fluid enclosure, may deform when in contact with a fluid, for example. A deformation of a solid component may be greater than about 1%, between about 1% and about 3% or between about 3% and about 10%, for example. The deformation of a solid component may be in response to a change in strain state of a solid component, for example.

As used herein, "change" or "changing" refers to becoming different or undergoing alteration or transformation.

As used herein, "change in strain state" refers to an altered state caused by an external force. For example, an altered state may include physical deformation or changes in electrical resistance. An external force may be physical, chemical or an electrical force, for example. A physical force may be a deformation caused by an increased or decreased mass of fluid in a flexible fluid enclosure, for example.

As used herein, "strain state" refers to a state of a material dependent on any strain exposed to the material.

As used herein, "function" refers to a variable so related to another that for each value assumed by one there is a value determined for the other. For example, deformation may be a function of the state of charge of a fluid enclosure such that as fluid mass within the enclosure varies, the deformation varies in a determinable way.

As used herein, "observable property" refers to a property of a material that can be measured or visually monitored. A material that changes color upon displacement is an example of an observable property.

As used herein, "secondary effects" refers to external forces that may affect a response to the state of charge of a fluid in contact with a fluid enclosure. For example, secondary effects may include environmental temperature, barometric pressure, humidity, fluid storage material settling, fluid storage material aging or combinations thereof.

As used herein, "displaying" refers to a visual representation of information. For example, displaying may refer to the creation or use of visible words, indicating lines, patterns, digital numbers, etc. in response to a state of charge of a fluid enclosure. Displaying may also refer to the illustration of words, symbols, or numbers on an electronic screen, such as an LCD screen, for example.

As used herein, "composite hydrogen storage material" refers to active material particles mixed with a binder, wherein the binder immobilizes the active material particles sufficient to maintain relative spatial relationships between the active material particles. Examples of composite hydrogen storage materials are found in commonly-owned U.S. patent application Ser. No. 11/379,970, filed Apr. 24, 2006, whose disclosure is incorporated by reference herein in its entirety.

As used herein, "metal hydride particles" or "metal hydrides" refer to metal or metal alloy particles that are capable of forming metal hydrides when contacted with hydrogen. Examples of such metal or metal alloys are FeTi, $ZrV_2$, $LaNi_5$, $Mg_2Ni$ and V. Such compounds are representative examples of the more general description of metal hydride compounds: AB, $AB_2$, $A_2B$, $AB_5$ and BCC, respectively. When bound with hydrogen, these compounds form metal hydride complexes, such as $MgH_2$, $Mg_2NiH_4$, $FeTiH_2$ and $LaNi_5H_6$, for example. Examples of metals used to form metal hydrides include vanadium, magnesium, lithium, aluminum, calcium, transition metals, lanthanides, and intermetallic compounds and solid solutions thereof.

As used herein, "fluid" refers to a continuous, amorphous substance whose molecules move freely past one another and that has the tendency to assume the shape of its container. A fluid may be a gas, liquefied gas, liquid, liquid under pressure or any one of the above in physical or chemical contact with a fluid storage material. Examples of fluids may include fluid reactants, fuels, oxidants, and heat transfer fluids. Fluid fuels used in fuel cells may include hydrogen gas or liquid and hydrogen carriers in any suitable fluid form. Examples of fluids include air, oxygen, water, hydrogen, alcohols such as methanol and ethanol, ammonia and ammonia derivatives such as amines and hydrazine, silanes such as disilane, trisilane, disilabutane, complex metal hydride compounds such as aluminum borohydride, boranes such as diborane, hydrocarbons such as cyclohexane, carbazoles such as dodecahydro-n-ethyl carbazole, and other saturated cyclic, polycyclic hydrocarbons, saturated amino boranes such as cyclotriborazane, butane, borohydride compounds such as sodium and potassium borohydrides, chemical hydrides such as chemical hydrides in an aqueous solution, and formic acid.

As used herein, "occluding/desorbing material" refers to a material capable of absorbing, adsorbing or retaining a substance and further capable of allowing the substance to be removed. The occluding/desorbing material may retain the substance chemically or physically, such as by chemisorption or physisorption, for example. Examples of such a material include metal hydrides, composite hydrogen storage materials, clathrates, etc.

As used herein, "occlude" or "occluding" or "occlusion" refers to absorbing or adsorbing and retaining a substance. Hydrogen may be the substance occluded, for example. A substance may be occluded chemically or physically, such as by chemisorption or physisorption, for example.

As used herein, "desorb" or "desorbing" or "desorption" refers to the removal of an absorbed or adsorbed substance. Hydrogen may be removed from active material particles, for example. The hydrogen may be bound physically or chemically, for example.

As used herein, "contacting" refers to physically, chemically or electrically touching or functionally integrating. A fluid may contact an enclosure, in which the fluid is physically forced inside the enclosure, for example. Contacting may include fluidic communication in which two or more components are in such position as to pass a fluid in one or more directions between them, for example. One or more fuel cells may contact a fluid enclosure, such as by fluidic communication. A fluid storage material may be functionally integrated within a fluid enclosure, such as being contained within (and yet, not be physically touching, for example).

As used herein, "releasing" refers to freeing from something that binds, fastens or holds back, either physically or chemically. A fluid may be physically released from an enclosure, for example. A fluid may be chemically or physically released from a fluid storage material, for example.

As used herein, "fluid enclosure" may refer to a device for storing a fluid. The fluid enclosure may store a fluid physically or chemically. For example, the fluid enclosure may chemically store a fluid in active material particles. A fluid enclosure may also refer to a fluid enclosure including active material particles and an outer enclosure wall, conformably coupled to the fluid storage component and may also include structural fillers. Examples of such a fluid enclosure are found in commonly-owned U.S. patent application Ser. No. 11/473,591, filed Jun. 23, 2006, whose disclosure is incorporated by reference herein in its entirety.

As used herein, "flexible fluid enclosure" or "flexible portion of a fluid enclosure" may refer to a fluid enclosure including a structural filler and an outer enclosure wall, conformably coupled to the structural filler. Examples of such a fluid enclosure are found in commonly-owned U.S. patent application Ser. No. 11/473,591, filed Jun. 23, 2006, whose disclosure is incorporated by reference herein in its entirety.

As used herein, "conformably coupled" refers to forming a bond that is substantially uniform between two components and are attached in such as way as to chemically or physically bind in a corresponding shape or form. A structural filler may be conformably coupled to an outer enclosure wall, for example, in which the outer enclosure wall chemically or physically binds to the structural filler and takes its shape.

As used herein, "outer enclosure wall" refers to the outermost layer within a fluid enclosure that serves to at least partially slow the diffusion of a fluid from the fluid enclosure. The outer enclosure wall may include multiple layers of the same or differing materials. The outer enclosure wall may include a polymer or a metal, for example.

As used herein, "structural filler" refers to a material with a sufficient tensile strength to withstand the internal pressure of a fluid enclosure, when pressurized with a fluid. Structural fillers may be solid. Structural fillers may include metallic or plastic lattices, composite hydrogen storage materials, clathrates, nano-structured carbon foams, aerogels, zeolites, silicas, aluminas, graphite, activated carbons, micro-ceramics, nano-ceramics, boron nitride nanotubes, borohydride powder, palladium-containing materials or combinations thereof, for example.

As used herein, "fluid storage material" refers to a material that may be in physical or chemical contact with a fluid, usually for the purpose of assisting the storage of the fluid. Hydrogen may be chemically bound with a metal alloy to provide a metal hydride, an example of a fluid storage material.

As used herein, "electrochemical cell" refers to a device that converts chemical energy to electrical energy or converts electrical energy to chemical energy. Examples of electrochemical cells may include galvanic cells, electrolytic cells, electrolyzers, fuel cells, batteries and metal-air cells, such as zinc air fuel cells or batteries. Any suitable type of electrochemical cell including fuel cells and appropriate materials can be used according to the present invention including without limitation proton exchange membrane fuel cells (PEMFCs), solid oxide fuel cells (SOFCs), molten carbonate fuel cell (MCFCs), alkaline fuel cells, other suitable fuel cells, and materials thereof. Further examples of fuel cells include proton exchange membrane fuel cells, direct methanol fuel cells, alkaline fuel cells, phosphoric acid fuel cells, molten carbonate fuel cells or solid oxide fuel cells.

An electrochemical cell layer, such as a fuel cell layer, may include one or more anodes, cathodes, and electrolyte interposed between the anodes and cathodes. In a fuel cell system, the cathodes may be supplied with air containing oxygen for use as an oxidizing agent, and the anodes may be supplied with hydrogen, for example, for use as fuel. The oxidizing agent may be supplied from air surrounding the fuel cell system, while the fuel or other reactant fluid may be supplied from the fluid reservoir.

Arrays of unit cells can be constructed to provide varied-power generating electrochemical cell layers in which the entire electrochemical structure is contained within the layer. This means additional components such as plates for collecting currents etc. can be eliminated, or replaced with structures serving different functions. Structures like those described herein are well adapted to be manufactured by continuous processes. Such structures can be designed in a way which does not require the mechanical assembly of individual parts. In some embodiments, the conductive path lengths within this structure may be kept extremely short so that ohmic losses in the catalyst layer are minimized. Array may refer to a plurality of individual unit cells. The plurality of cells may be formed on a sheet of ion exchange membrane material, a substrate, or may be formed by assembling a number of components in a particular manner.

Unit cells according to the invention may be used in a planar electrochemical cell layer that is conformable to other geometries, as described in U.S. patent application Ser. No. 11/185,755, filed on 21 Jul. 2004, entitled "DEVICES POWERED BY CONFORMABLE FUEL CELLS" and U.S.

Patent Application Ser. No. 60/975,132, filed 25 Sep. 2007, entitled "FLEXIBLE FUEL CELL," which are hereby incorporated by reference.

Arrays can be formed to any suitable geometry. Examples of planar arrays of fuel cells are described in co-owned U.S. patent application Ser. No. 11/047,560 filed on 2 Feb. 2005 entitled "ELECTROCHEMICAL CELLS HAVING CURRENT CARRYING STRUCTURES UNDERLYING ELECTROCHEMICAL REACTION LAYERS", the disclosure of which is herein incorporated by reference. Fuel cells in an array can also follow other planar surfaces, such as tubes as found in cylindrical fuel cells. Alternately or in addition, the array can include flexible materials that can be conformed to other geometries.

Embodiments of the present invention relate to sensing devices for use with fluid enclosures. Such fluid enclosures may be utilized with fuel generators, such as hydrogen generators. Examples of such devices can be found in co-owned U.S. patent application Ser. No. 11/538,027, filed Oct. 2, 2006, entitled "HYDROGEN SUPPLIES AND RELATED METHODS", the disclosure of which is herein incorporated by reference.

Referring to FIG. 1, a perspective view 100 of a component and its dimensions associated with a deformation is shown, according to some embodiments. A component 100 may alter its dimensions based on a deformation. In FIG. 1, for example, a component 100 may change dimensions 102, 106 and 110 to the larger dimensions of 104, 108 and 112 respectively, when charged with a fluid, such as hydrogen. Charging a component 100 may include filling, contacting, occluding, absorbing, adsorbing, etc. with a fluid, such as hydrogen. The component 100 may comprise a fluid storage material or a fluid enclosure, for example. The dimensions 104, 108 and 112 may be up to about 10% greater than dimensions 102, 106 and 110, for example. The change in dimensions may be reversible as the fluid mass decreases within the component 100. The shape of the component may be arbitrary or prismatic and any of its dimensions may be altered with a deformation, for example.

Many types of charge indicators may be utilized to respond to a deformation of component 100. A charge indicator may comprise a liquid or solid that may displace with a deformation. A charge indicator may include a solid that changes an observable property as it is displaced. An observable property may be color, for example. A charge indicator may be a mechanical indicator in contact with the component 100, for example. The charge indicator may respond directly to the deformation, such as with a mechanical linkage, or indirectly by responding to an electronic signal or change in electrical properties of the component 100 based on the deformation, for example. A charge indicator may include an optical interference pattern, such that a visual pattern may be created or altered based on the deformation. Examples of optical interference patterns may include faceted patterns, grids, pixels, one or more visible words, or combinations thereof. The charge indicator may include an array of conductors on the surface of the component and in contact with one or more fixed brushes, for example. As a deformation alters the dimensions of a component, the conductors may respond to the number of brushes currently in contact, for example.

In some embodiments, the component 100 may not be visible to a user. The charge indicator would then communicate information about the state of charge associated with a fluid enclosure from within a system, such as a fuel cell system, to some exterior location where the information may be communicated to a user or to a monitoring system, for example. A transducer, such as an electronic transducer, may be in contact with the component 100 and indicate the state of charge of the fluid enclosure as a function of the deformation of the component 100, for example. An extensometer or strain gauge may be an example of an electronic transducer. The deformation may also be monitored indirectly by responding to the electrical resistance of the component 100, such as with a charge-variable resistor, for example. A charge-variable resistor may comprise conductive rubber, for example, disposed along the surface of the fluid enclosure such that the electrical resistance of the rubber varies as the fluid enclosure deforms. Alternately or in addition, the deformation may be monitored by responding to the capacitance of the component. For example, an overlapping area between surfaces of multiple conductors may change in capacity as the fluid enclosure deforms.

The component 100 may include a metal hydride, a composite hydrogen storage material or a mixture thereof. The component 100 may include a structural filler, such as metallic or plastic lattices, composite hydrogen storage materials, clathrates, nano-structured carbon foams, aerogels, zeolites, silicas, aluminas, graphite, activated carbons, micro-ceramics, nano-ceramics, boron nitride nanotubes, borohydride powder, palladium-containing materials or combinations thereof, for example. The component 100 may include a flexible fluid enclosure or a flexible portion of a fluid enclosure, for example.

Figure 2:
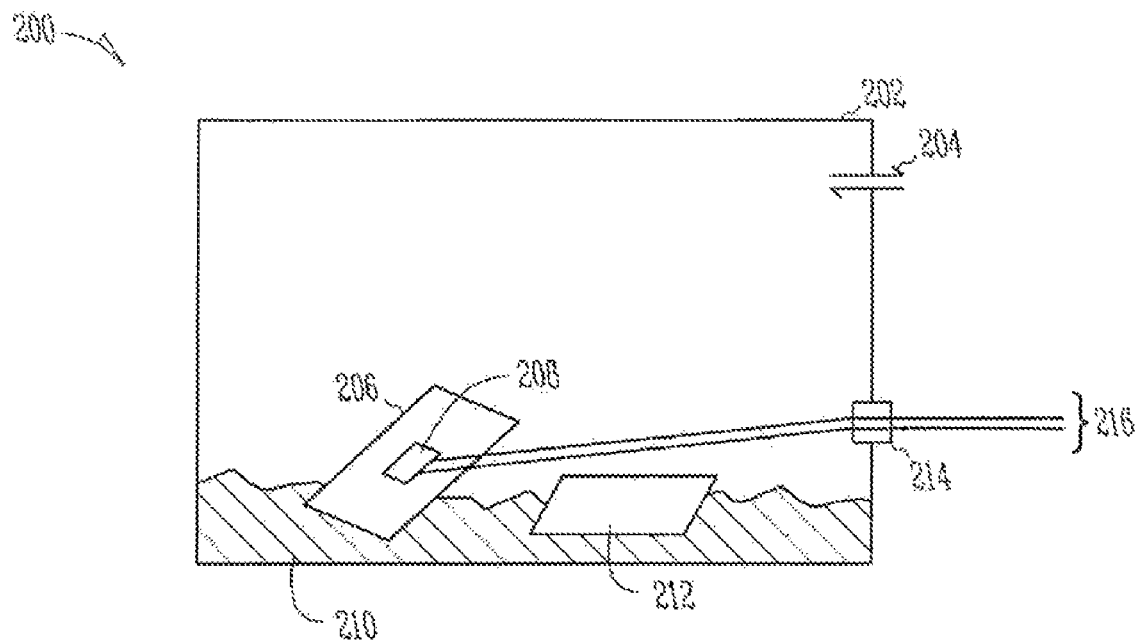
FIG. 2 illustrates a schematic view of a fluid enclosure containing a fluid storage material, according to some embodiments.

Referring to FIG. 2, a schematic view 200 of a fluid enclosure containing a fluid storage material is shown, according to some embodiments. A fluid enclosure 202 may enclose fluid storage material. The fluid storage material may comprise a composite hydrogen storage material 212, metal hydride powder 210 and a composite hydrogen storage material 206 in contact with a state of charge indicator 208. The state of charge indicator 208 may be a transducer and be in contact with transducer connector leads 216 or measuring leads, for example. The leads 216 may be in contact with the fluid enclosure 202 through a sealed aperture 214, for example. The leads 216 may be in contact with a solid component, such as the fluid enclosure or fluid storage material. A fluid inlet/outlet port 204 may also be positioned in contact with the fluid enclosure 202. As the strain state changes within the composite hydrogen storage material 212 and metal hydride powder 210, the state of charge of the fluid enclosure 202 may be monitored as the one or more composite hydrogen storage materials 206 in contact with a state of charge indicator 208 deforms, correlating to the state of charge of all fluid storage material within the fluid enclosure 202. The state of charge indicator 208 may be transducer, such as an extensometer, a resistance or fiber strain gauge, for example.

The fluid storage material may be capable of occluding/desorbing a fluid, for example. The composite hydrogen storage material 212 and 206 may be capable of occluding and desorbing hydrogen, for example. The fluid may be a gas, a liquefied gas, a liquid or a combination thereof. The fluid may be hydrogen, for example.

Figure 3:
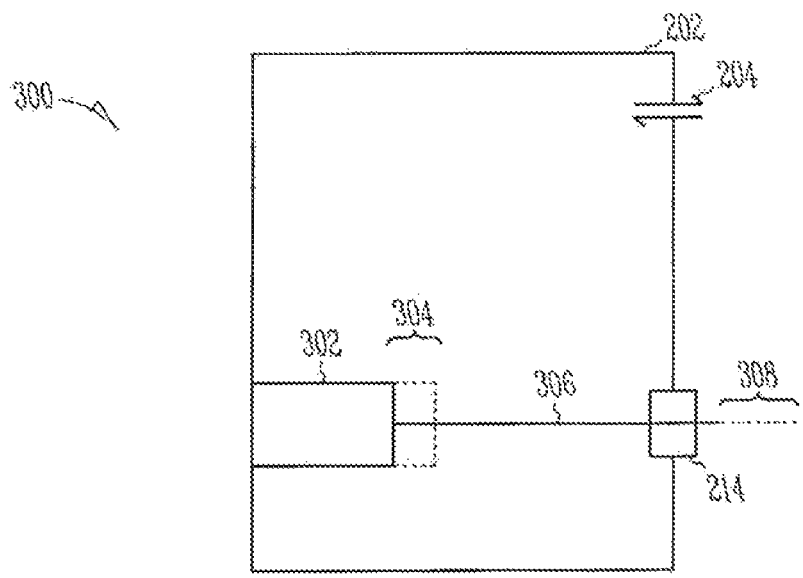
FIG. 3 illustrates a schematic view of a fluid enclosure including a mechanical transducer, according to some embodiments.

Referring to FIG. 3, a schematic view 300 of a fluid enclosure including a mechanical transducer is shown, according to some embodiments. A fluid enclosure 202 may enclose a fluid storage material 302. A mechanical transducer 306, such as a mechanical linkage, may be in contact with the fluid storage material 302. The mechanical transducer 306 may be in contact with the fluid enclosure 202 through a sealed aperture 214, for example. A fluid inlet/outlet port 204 may also be positioned in contact with the fluid enclosure 202. As the fluid storage material 302 deforms, it may change its dimensions 304. The mechanical transducer 306 would then change position 308 as a function of the deformation of the fluid storage material 302. The position change 308 may then be an indication of the state of charge or be used to communicate that information to a monitoring system, for example.

Figure 4:
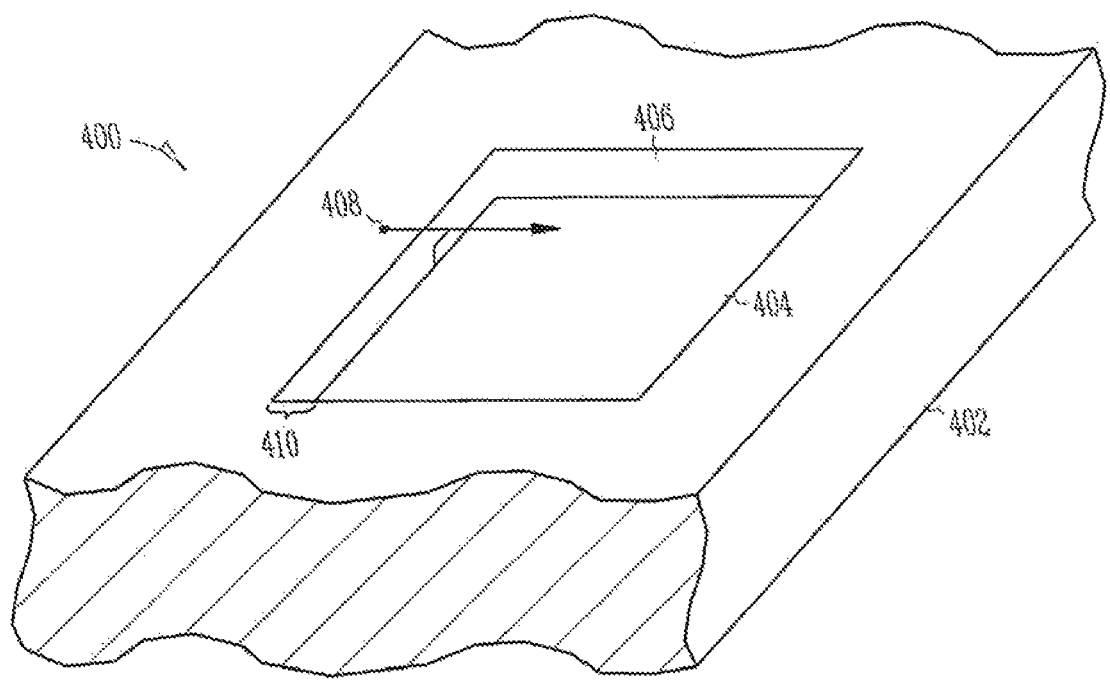
FIG. 4 illustrates a perspective view of a portion of an electronic device and a fluid enclosure, according to some embodiments.
Figure 5:
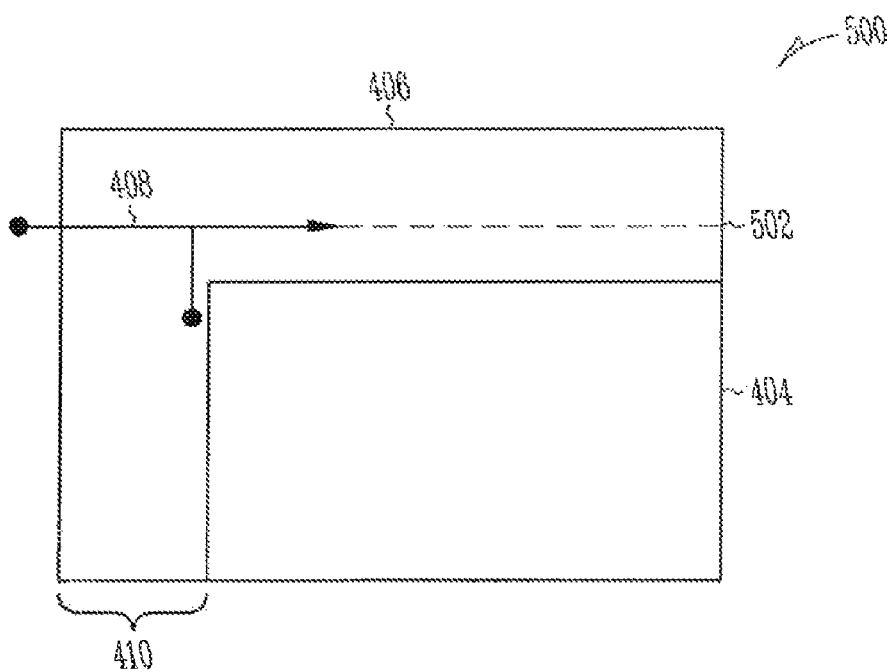
FIG. 5 illustrates a schematic view of a fluid enclosure in an empty state of charge, according to some embodiments.
Figure 6:
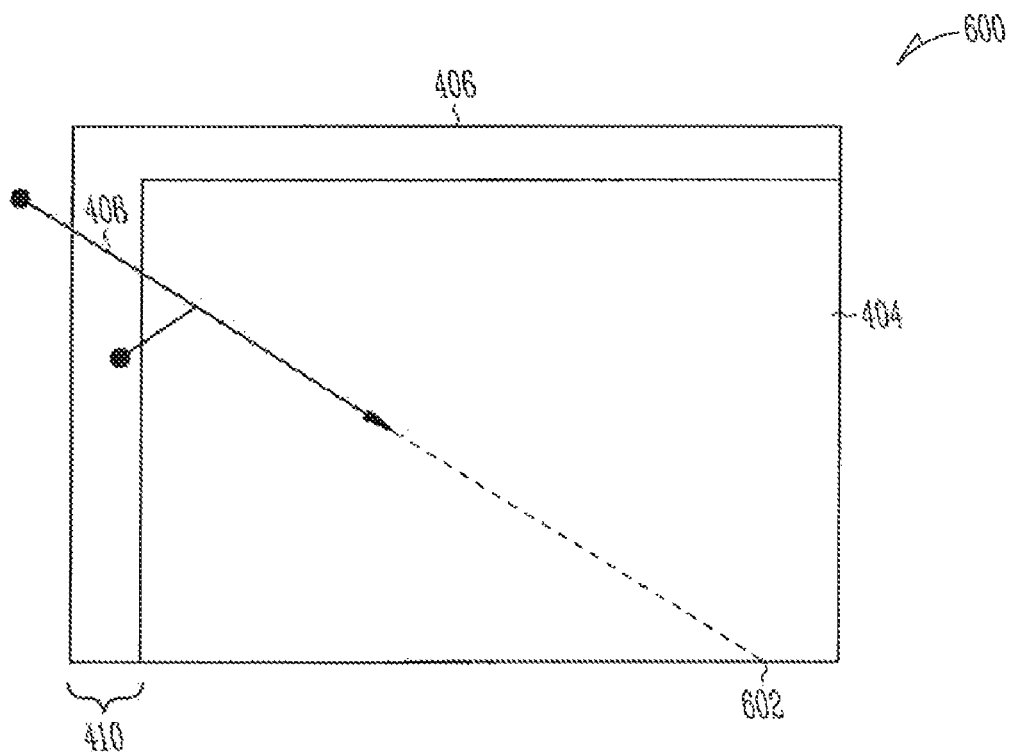
FIG. 6 illustrates a schematic view of a fluid enclosure in a full state of charge, according to some embodiments.

Referring to FIG. 4, a perspective view 400 of a portion of an electronic device and a fluid enclosure is shown, according to some embodiments. A portion of an electronic device 402 may surround a fluid enclosure 404 and a cavity 406 enclosing or adjacent the fluid enclosure 404. A charge indicator 408 may be in contact with the fluid enclosure 404 and also in contact with the portion of an electronic device 402. As the fluid enclosure 404 deforms, the charge indicator 408 may respond to the deformation, such as by responding to the change in distance 410 between the fluid enclosure 404 and the cavity 406, for example. The charge indicator 408 may indicate an empty state of charge 502 of the fluid enclosure 404 (as shown in FIG. 5). As the fluid enclosure 404 changes dimensions in response to a deformation, the distance 410 between the fluid enclosure 404 and cavity 406 may change. The charge indicator 408 may then indicate a full state of charge 602 (as shown in view 600 in FIG. 6). The charge indicator may also indicate any level of partial charge between an empty or full state.

The fluid enclosure 404 may be flexible or a portion of the fluid enclosure may be flexible, such that the deformation due to fluid mass within the fluid enclosure causes dimension changes or changes in electrical properties of the fluid enclosure, for example.

The charge indicator 408 may be a mechanical displacement device, for example. Further examples of charge indicators 408 may be open cell foam, closed cell foam, a spongy material or an elastomer that expands on discharge of a fluid, a fluid drawn into an increasing volume or a lever based indicator. The fluid enclosure 404 or a portion of the enclosure may change color due to the deformation, for example.

The portion of electronic device 402 may be part of a fluid enclosure system, such as fuel cell system, for example. The fluid enclosure system may include a volume less than about 1000 cubic centimeters, for example. Examples of electronic devices include a cellular phone, satellite phone, PDA, laptop computer, computer accessory, ultra mobile computer, display, personal audio or video player, medical device, television, transmitter, receiver, lighting device, flashlight or electronic toy. A fuel cell system may include at least one or more components, a charge indicator in contact with the one or more components, and one or more fuel cells in contact with one or more of the components and charge indicator, for example.

Figure 7:
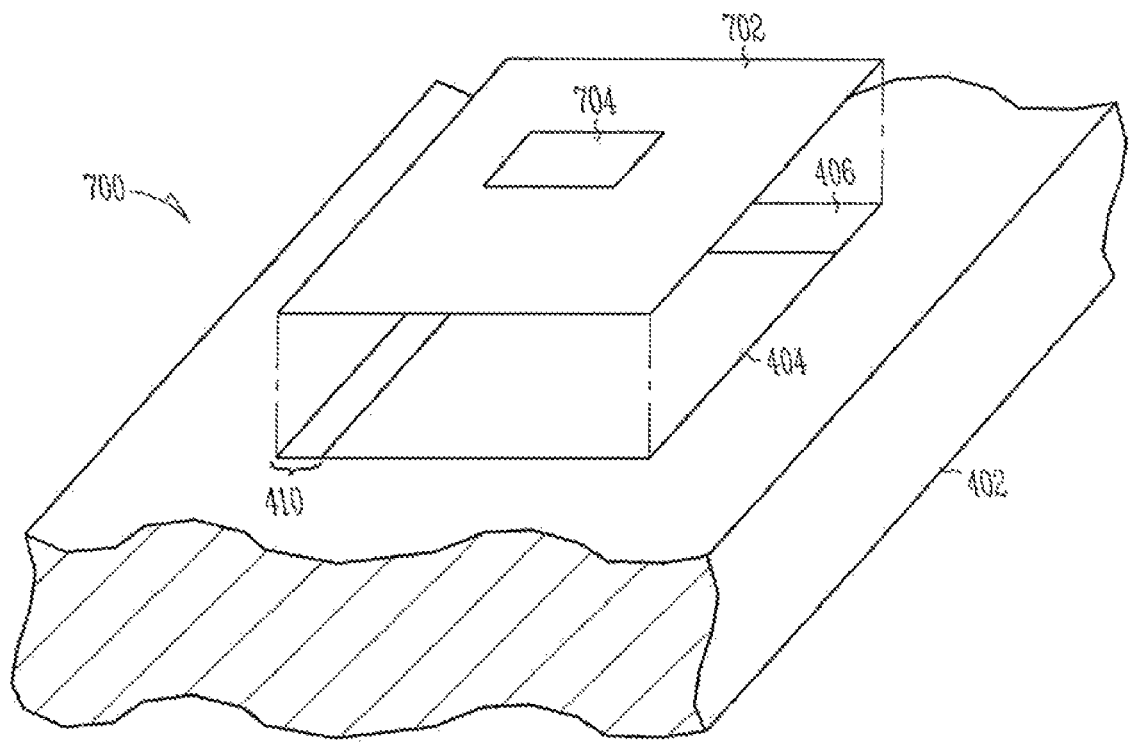
FIG. 7 illustrates a perspective view of a portion of an electronic device and a fluid enclosure including an observation window, according to some embodiments.
Figure 8:
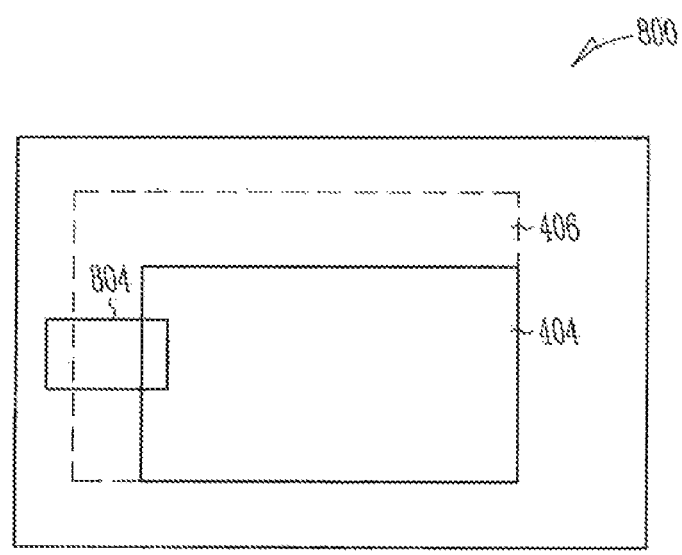
FIG. 8 illustrates a schematic view of a fluid enclosure including an observation window, according to some embodiments.
Figure 9:
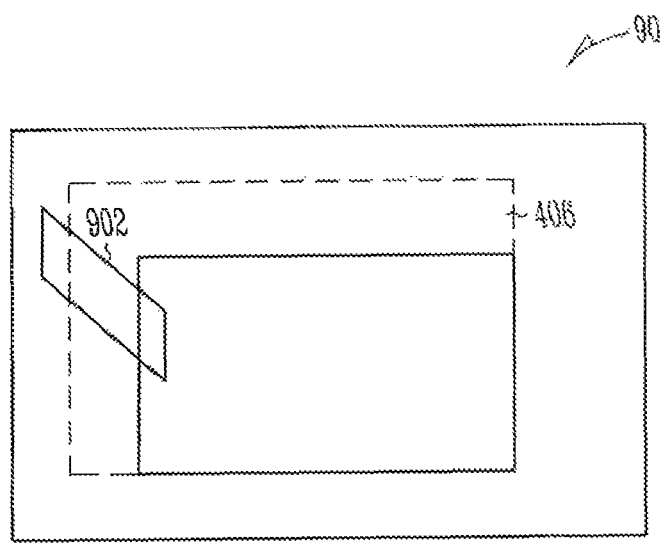
FIG. 9 illustrates a schematic view of a fluid enclosure including an observation window at an angle less than perpendicular, according to some embodiments.

Referring to FIG. 7, a perspective view 700 of a portion of an electronic device and a fluid enclosure including an observation window is shown, according to some embodiments. A portion of an electronic device 402 may surround a fluid enclosure 404 and a cavity 406 enclosing the fluid enclosure 404. A cover 702 may contact the cavity 406 and the fluid enclosure 404. The cover 702 may have an observation window 704 disposed within in order to visually observe changes in the dimensions of the fluid enclosure 404, such as by observing the changing distance 410 between the cavity 406 and fluid enclosure 404, for example. The observation window 704 may be an observation window 804 at an angle about 90 degrees or an observation window 902 at an angle less than about 90 degrees, for example (as shown in views 800 and 900 in FIGS. 8 and 9, respectively). If the observation window 902 is at an angle less than about 90 degrees (about 50 degrees would be an example), then the dimension change of the fluid enclosure 404 may be more observable or amplified. The dimension change of the fluid enclosure 404 may be visually noted using color stripes, hash marks or grids, for example.

Figure 10:
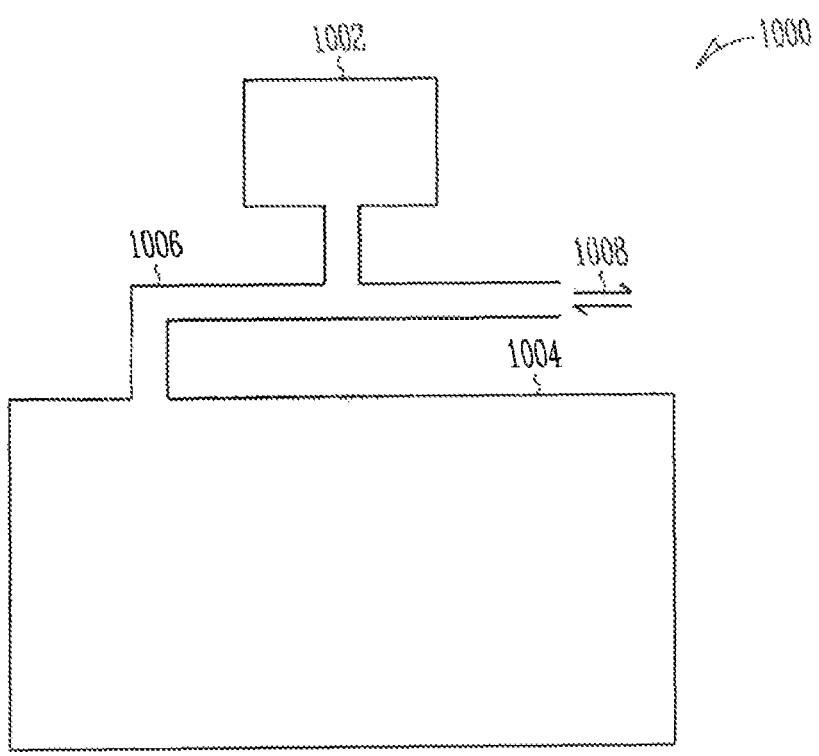
FIG. 10 illustrates a schematic view of a state of charge indicator system utilizing more than one fluid enclosure, according to some embodiments.

Referring to FIG. 10, a schematic view 1000 of a state of charge indicator system utilizing more than one fluid enclosure is shown, according to some embodiments. The state of charge of a larger fluid enclosure 1004 may be indicated by the correlated state of charge of a smaller fluid enclosure 1002 associated with a charge indicator, for example. Fluid may pass through a connection 1006 before or after contacting the fluid inlet/outlet 1008. If substantially the same fluid or fluid storage material is utilized in each enclosure, the state of charge of the smaller fluid enclosure 1002 may be utilized as an indication of the state of charge of the larger fluid enclosure 1004, without it being separately monitored.

Figures 11, 12:
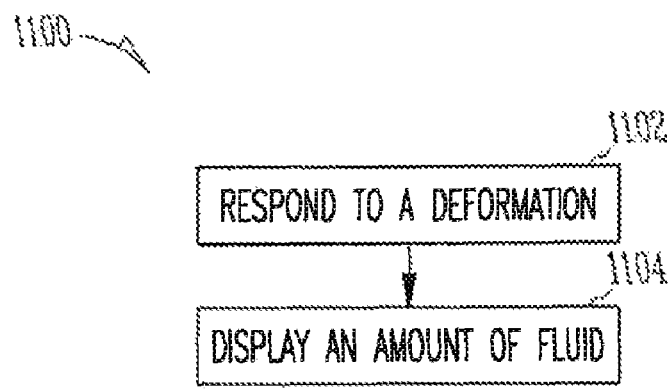
FIG. 11 illustrates a block flow diagram of a method of using a state of charge indicator, according to some embodiments.
FIG. 12 illustrates a schematic view of a system including a fluid enclosure and a sensing device, according to some embodiments.

Referring to FIG. 11, a block flow diagram 1100 of a method of using a state of charge indicator is shown, according to some embodiments. A charge indicator may respond 1102 to a deformation of a component. A state of charge or a mass of fluid may then be displayed 1104. Displaying may include converting the response to a digital display, such as on an LCD screen, for example. Responding 1102 may include displacing a solid, displacing a liquid or resisting an electrical signal, for example.

Referring to FIG. 12, a schematic view 1200 of a system including a fluid enclosure 1202 and sensing device 1204 is shown, according to some embodiments. The fluid enclosure may be an example of a solid component, in contact with the sensing device or positioned remote to the sensing device, for example. The sensing device 1204 may be a photosensor and include an emitter 1206 and a receptor 1208 that detect a property associated with a distance between the emitter 1206 and the receptor 1208 of the device 1204 and the fluid enclosure 1202, as indicated schematically by arrow 1210. The photosensor may detect an amount of light in proportion to a change in one or more dimensions of the fluid enclosure. Examples of properties detected by the emitter 1206 and the receptor 1208 include optical properties, such as luminosity, electrical properties such as electrical fields, magnetic fields or capacitive coupling, acoustic waveforms, such as ultrasonic waveforms, various other properties, or combinations thereof. Such properties may be a function of one or more dimension changes in the fluid enclosure 1202. The distance may be the distance of a cavity between the device 1204 and fluid enclosure 1202. The enclosure 1202 may be disposed at least partially in the cavity. The distance between enclosure 1202 and sensing device 1204 or distance of the cavity may vary up to about 0.8 mm, about 1.2 mm, about 1.8 mm, about 2 mm or about 2.5 mm, for example. The photosensor may be positioned remotely from the fluid enclosure.

The sensing device 1204 may include a variety of non-contact sensing components arranged at some distance from the fluid enclosure 1202. Specifically, the emitter 1206 and the receptor 1208 may be disposed on a substrate 1212, such as a printed circuit board (PCB). As the fluid enclosure 1202 deforms or changes in one or more dimensions, a distance may change between the emitter 1206 and the receptor 1208 of the device 1204 and the fluid enclosure 1202, as indicated schematically by arrow 1210. The one or more dimensions may be parallel or orthogonal in relation to the sensing device 1204, for example. The fluid enclosure 1202 may maintain substantially the same volume during charging/discharging of a fluid, but may include a flexible or expanding portion that may be detected for movement. The sensing device 1204 may be positioned near such a target region.

In some embodiments, the sensing device 1204 includes optical non-contact sensing components, such as a light emitting diode (LED) emitter and a light receptor, that detect distance 1210 as a function of an optical property. The LED and the receptor may be matched to optimize sensitivity of the sensing device 1204. In an example, the sensing device 1204 may include an infrared LED and an infrared receptor. In another example, the LED may function as the emitter 1206 and the receptor 1208. Further, the LED may emit light within a narrow focus or a broader focus, as described in greater detail below. In operation, the device may prompt the LED to emit light. Light may be reflected from the surface of the fluid enclosure 1202. The optical receptor receives the reflected light and detects an optical property associated with the reflected light that varies in response to distance 1212.

The sensing device 1204 may detect a property in response to the arrangement or position of the emitter 1206, the receptor 1206, and the fluid enclosure 1202. Therefore, although the embodiment shown in FIG. 12 illustrates non-contact components arranged on the substrate 1212 at distance 1210 from the fluid enclosure 1202, the emitter 1206 and the receptor 1208 may be arranged in a variety of other configurations.

In one embodiment, the sensing device 1204 may include a magnetoresistive sensor that senses a property of the magnetic field between the fluid enclosure 1202 and the non-contact components of the sensing device 1204. The magnetoresistive sensor may include a magnetic receptor disposed on the substrate 1212 and a modifying element, such as a magnet, disposed on the surface of the fluid enclosure 1202. The magnetoresistive sensor detects an electric property of the magnetic field that varies in proportion to distance 1210. In one example, the magnetoresistive sensor may be an anisotropic magnet. The modifying element may modify a property detected by the sensing device and may be optionally enclosed within an electronic device. The modifying element may be coupled to a fluid enclosure by way of an adhesive layer, for example.

Other than a fluid enclosure or fluid storage material, solid components may include overlapping conductive layers that change capacitance as the fluid enclosure changes dimensions. This is another example of the sensing device detecting fluid enclosure dimension changes indirectly.

The system may optionally include an infrared photosensor that additionally determines a temperature of the fluid enclosure, electronic device or other system components. As the temperature may affect the state conditions readings, a controller, microprocessor or other adapter may adjust the state condition reading or modify the mass of fluid in response to such temperature readings.

Referring now to FIGS. 13A-D, a schematic view 1300 of a system including a sensing device 1301 with non-contact optical components is shown, according to some embodiments. The device 1301 may include an LED 1302 and a receptor 1304 arranged a distance, as indicated by arrow 1320, on a printed circuit board (PCB) 1306. The LED 1302 emits light, as indicated at 1308, to a target region 1310 on the surface of a fluid enclosure 1312. An amount of light received by the target region 1310 depends on the focus of LED 1302, as indicated by arrow 1316. A lens of the LED 1302, for example, may be selected to provide a desired focus. The light may be reflected from the target region 1310 and received by the receptor 1304.

Under some conditions, it may be desirable to reflect light from a diffusive surface 1314 within the target region 1310. The surface may be light diffusive, for example. In doing this, light properties detected by the receptor 1304 may exhibit more variability as a function of the distance between the fluid enclosure 1312 and the non-contact components. Therefore, the surface of the fluid enclosure 1312 may be altered to provide a more diffusive surface within the target region 1310. The surface may be modified in other ways to create, enhance or alter a signal. The surface may be reflective, for example.

Referring to the system view 1300 shown in FIG. 13A, the target region 1310 may be treated with an abrasive, for example, to modify the texture of the surface of the fluid enclosure 1312. In doing this, LED 1302 having a lens 1318 that provides a relatively narrow focus may be reflected at a variety of angles from the target region; therefore, at a relatively close range, the receptor may detect a relatively comparable luminosity as light emitted, but light received from a distance will measure a smaller portion of the light diffused by the target material. Alternately, a layer or coating of material with selected light-responsive properties, such as diffusivity and reflectivity, may be applied to the surface. The layer or coating of material may be applied to the surface by any number of methods, such as painting, transferring, or adhering. The layer or coating of material may further be applied directly onto the surface, or indirectly, such as through use of a 'sticker' or adhered strip. The embodiment shown in FIG. 13B illustrates the fluid enclosure 1312 having a non-planar object 1322 deposited on the surface to modify the angle at which the light is reflected.

In other embodiments, the surface of the fluid enclosure 1312 may be unmodified. In the embodiment of FIG. 13C, for example, the emitter 1302 and the receptor 1304 may be arranged at a greater distance 1320 apart than the embodiment of FIGS. 13A-B. In doing this, light reflected from the fluid enclosure may exhibit greater variability in response to the distance between the fluid enclosure 1312 and the non-contact components. Further, the sensing device 1301 may include LED 1302 having a lens 1324 that emits a broader focus, as indicated by arrow 1316, than the embodiment shown in FIGS. 13A-B. In the embodiment of FIG. 13D, the device 1301 includes a compressible element 1326 that modifies a light transmission path from the LED 1302 to the receptor 1304 in response to a degree of compression. The degree of compression may change as a result of compression by the fluid enclosure 1312 and the PCB 1306 as the fluid enclosure deforms. The compressible element 1326 may be a fluid or gel, for example.

The sensing device 1301 and the fluid enclosure 1312 may be integrated in an electronic device. The electronic device may entirely or partially enclose the sensing device 1301 or the fluid enclosure or both within the housing of the device. In one embodiment, the sensing device 1301 and/or the fluid enclosure may be coupled to the housing of the device. For example, the PCB 1306 may be mounted to an inner surface of the housing. Further, the housing of the device may include an opening or an access region for allowing the user to interact with components enclosed within the device.

In some embodiments, the fluid enclosure 1312 may be removable or replaceable. The user may remove and/or replace the fluid enclosure 1312 via the opening or the access region. As such, the system may include an optional encryption system to provide security capabilities. Specifically, the encryption system may include an encryption element to identify a characteristic of the fluid enclosure. The encryption element may identify the fluid enclosure as compatible with one or more of the device, the sensing system, various other components enclosed within the device, or any combination thereof. In this way, the encryption element may verify that the user is replacing the fluid enclosure 1312 with either the removed fluid enclosure (e.g., after replenishing, etc.) or an appropriate replacement for the fluid enclosure 1312.

The encryption element may provide a verification effect when the fluid enclosure is coupled to the device. In some embodiments, the verification effect may be an indicator for conveying information to the user. An observable property of the encryption region may change in response to coupling the fluid enclosure to the system. For example, the encryption element may be positioned along the surface of the enclosure 1312 within the target region 1310 or may be integrated with non-planar object 1322, the compressible element 1326, the surface of the fluid enclosure 1312, such as within the target region 1310, any other elements or portions of the fluid enclosure, or any combination thereof. The encryption region may be adhered, etched, stamped, or otherwise modified to provide the desired effect. The change of the property may indicate to the user that the fluid enclosure is verified as compatible. Further, the encryption element may exhibit characteristics such that a change in property may occur after a predetermined period of time, such as associated with a lifetime of the fluid enclosure.

While the embodiments described above may indicate to the user that the fluid enclosure is compatible, in other embodiments the encryption element may modify a property that is ultimately detected by the sensing device. In particular, the encryption element may store or contain security or system operability information that recognizes the type or configuration of the fluid enclosure.

Operation of the system may vary in response to the characteristics that are identified based on the encryption device. In a hybrid system, for example, power may be supplied to the electronic device by a battery when the state of charge of the fluid enclosure is determined to be below a predetermined threshold. In another example, the encryption element may identify a type of fluid enclosure. The state of charge of the fluid enclosure may be determined in a different fashion depending on the design and materials used in the fluid enclosure. In another example, the encryption element may identify a fluid stored in the fluid enclosure. As such, the system may operate based on the fuel type stored in the fluid enclosure. Further, the fluid enclosure may be identified as compatible with the mechanism of the sensing device based on the fuel type identified via the encryption device.

Referring back to the embodiments of FIG. 13A-D, the system 1300 includes an optical sensing device that may detect properties of light reflected to from the encryption device to the receptor according to the mechanisms described above. The encryption region may be defined to provide light having a predefined verification luminosity to the receptor 1304. As such, the encryption element may include a reflective surface having specific texture or topography to modify a light transmission path reflected to the receptor. The system may include an optional controller to determine whether or not the fluid enclosure is appropriately matched to the system and/or the device based on the luminosity of the reflected light, as modified by the encryption element. The determination may be made intermittently or may be continuously determined and may further be determined independently or in coordination with other state conditions. Such determination may include permission-based observations, such that the controller may enable use of the enclosure or system or may prevent such use.

Figure 15:
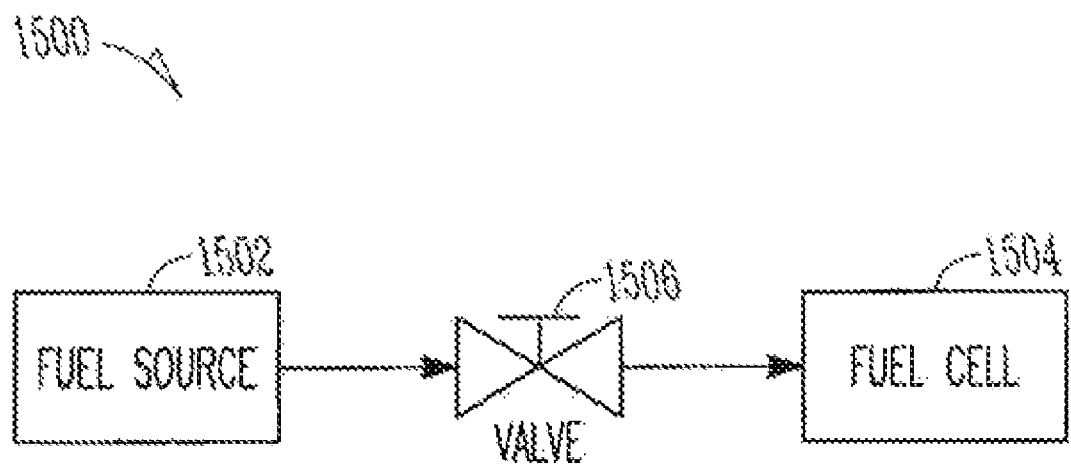
FIG. 15 illustrates a schematic view of a system including one or more valves positioned between an electrochemical cell and a fluid enclosure.

The fluid enclosure 1312 may fluidically communicate with one or more electrochemical cells. The electrochemical cells may be fuel cells or electrolytic cells, for example. The one or more electrochemical cells may be coupled to the sensing device, an electronic device or both, for example. The system may also include one or more valves positioned between the electrochemical cells and fluid enclosure, as shown in FIG. 15. FIG. 15 illustrates system 1500 having one or more valve 1506 positioned between electrochemical cell 1504 and fluid enclosure 1502. An interface may also be provided for replenishing the fluid enclosure.

Figure 14:
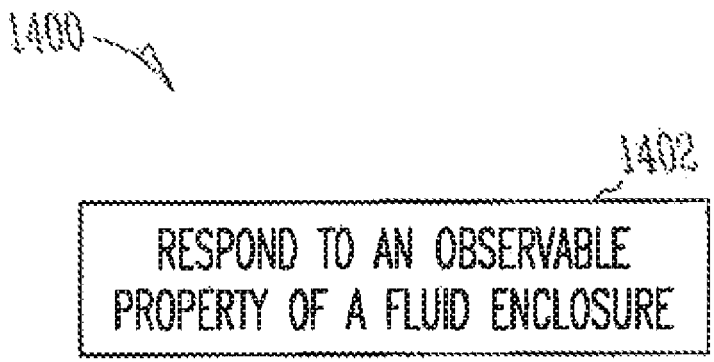
FIG. 14 illustrates a block flow diagram of a method of monitoring a state of a fluid enclosure, according to some embodiments.

Referring to FIG. 14, a block flow diagram 1400 of a method of monitoring a state of a fluid enclosure is shown, according to some embodiments. A sensing device may respond 1402 to an observable property of a fluid enclosure. The observable property may be a function of the mass of a fluid in contact with the fluid enclosure. The mass of the fluid contained within the fluid enclosure may be determined based on the observable property. Further, a state of charge of the fluid enclosure may be determined based on the observable property. Determining may include determining that the fluid enclosure is substantially empty when the mass of the fluid in contact with the fluid enclosure is below a predetermined threshold or that the fluid enclosure is substantially full when the mass of the fluid in contact with the fluid enclosure is above a predetermined threshold. The method may further include providing a signal in response to a change in a state of charge. The state of charge or mass of fluid stored may be determined in numerical amounts or determined relative to the total volume stored or on a qualitative scale. Examples include determining whether the enclosure is "half-full, three quarters full, etc." or contains "1 unit of fluid, 2 units of fluid, etc." based on predetermined measurements of enclosure volume or capacity.

A variety of other parameters may influence the mass of the fluid determined. Thus, determining the mass of the fluid enclosure may include detecting various other properties and conditions of the fluid enclosure as well as throughout the system. For systems that store and release fluids in exothermic and/or endothermic reactions, the mass of fluid determined may vary with temperature. As such, the mass of the fluid determined based on the observable property may also be based on a temperature conditions, such as a temperature of the fluid enclosure, a temperature within the device, and/or an environmental temperature outside of the device. Further, the mass of the fluid may be further based on a usage time or a predicted level of degradation. The method may also include continuously or intermittently storing such information.

The method may include determining other state conditions of the fluid enclosure based on the observable property. State conditions may include a temperature of the fluid enclosure, a pressure of the fluid enclosure, the duration of time before the fluid enclosure is empty, a degree of degradation of the fluid enclosure, an unsafe condition, and a predicted lifetime of the fluid enclosure, for example.

The method may also include responding to a non-visible property in addition to the observable property. For example, embodiments using infrared sensing components to determine the mass of fluid in the fluid enclosure may operate to detect temperature as well as luminosity.

In addition, the step of verifying compatibility of the fluid enclosure with the system and/or device in response to the observable property of the fluid enclosure may be performed. The step may include authenticating the fluid enclosure in response to a permission-based observable property of the fluid enclosure. A compatible fluid enclosure may include an encryption element that may be configured to modify a property for detection by the sensing device. If the detected property falls outside of a predetermined verification property or a predetermined verification property range, the fluid enclosure may be determined to be incompatible. In an example, the encryption element may diffuse light from the LED to a luminosity level below a predetermined verification luminosity; thus, fluid enclosures that reflect light having a luminosity below the predetermined verification luminosity are determined to be compatible. Otherwise, an incompatible fluid enclosure may be determined. In this way, the compatibility of the fluid enclosure may be continuously verified while the observable property is being detected. The system may reject a fluid enclosure not verified or prevent use of the system in such a circumstance.

Alternatively, the controller may execute instructions to determine whether or not an appropriate fluid enclosure has been coupled to the device in response to a specific event or predetermined trigger. The controller may receive signals provided by response to a change in a state of charge. For example, the controller may adjust a mass of fluid in the fluid enclosure in response to a signal, such as an independent temperature reading or state condition reading. Further, instructions for verifying compatibility of the fluid enclosure may be distinct from instructions to determine other state conditions. For example, the LED may be prompted to flash light at an unusually high luminosity when the device is turned on. The LED may also be triggered when a fluid enclosure may be replaced or coupled to the device and/or system. Note that it may be determined that a fluid enclosure has been coupled to the device as a function of the observable property.

The method may include varying operation of the system in response to the determined state of the fluid enclosure. The controller (not shown), for example, may process electronic signals that communicate state conditions of the fluid enclosure and operate the system based on the state conditions. The controller may prevent the system from operating, shut-off operation of the system, or prompt the system to operate in a low-power mode or in a performance mode. The method may further include shutting off a valve in fluid communication with the fluid enclosure, varying operation of the fluid enclosure so as to prevent use of the fluid enclosure or to reduce or increase a flow of fluid transferred to or from the fluid enclosure, as examples.

What is claimed is:

1. A device for measuring a state of charge of a fluid enclosure of an electronic device that is powered by at least one fuel cell, the device comprising:
    a sensing device that responds to a change in distance between the fluid enclosure and a substrate, wherein the sensing device is disposed on the substrate and includes a photosensor;
    wherein the fluid enclosure stores a fuel for the at least one fuel cell;
    wherein the change in distance is a function of at least one dimension of the fluid enclosure, wherein the change in distance indicates a proximity of the fluid enclosure to the substrate, and is caused by a transport of the fuel from the fluid enclosure and an amount of fuel within the fluid enclosure indicates the state of charge of the fluid enclosure.

2. The device of claim 1, wherein the distance encompasses a length of a cavity adjacent to the fluid enclosure.

3. The device of claim 2, wherein the fluid enclosure is disposed in at least part of the cavity.

4. The device of claim 1, wherein the sensing device detects an observable property of the fluid enclosure in proportion to the distance.

5. The device of claim 1, wherein the photosensor detects an amount of light in proportion to a change in dimension of the fluid enclosure.

6. The device of claim 1, wherein the photosensor comprises an emitter and a receptor.

7. The device of claim 6, wherein the emitter and the receptor are positioned such that a light transmission from the emitter reflects from a target region of the fluid enclosure to the receptor.

8. The device of claim 1, wherein the photosensor comprises an infrared light emission diode and an infrared phototransistor.

9. The device of claim 1, wherein the fluid enclosure includes a solid component.

10. The device of claim 9, wherein the solid component comprises a fluid storage material enclosed within an outer enclosure wall.

11. A fluidic system of an electronic device, comprising:
    a fluid enclosure in fluid communication with one or more electrochemical cells, wherein the fluid enclosure stores a fuel for the one or more electrochemical cells and is located within a cavity defined by the electronic device, and the one or more electrochemical cells are located within the electronic device; and
    a sensing device that responds to a change in at least one dimension of the fluid enclosure;
    wherein the sensing device is at least partially enclosed within the electronic device and includes a photosensor that detects an amount of light in proportion to a distance between at least a portion of the fluid enclosure and the sensing device, wherein the change in distance indicates a proximity of the fluid enclosure to the sensing device.

12. The fluidic system of claim 11, wherein the one or more electrochemical cells comprise fuel cells.

13. The fluidic system of claim 11, wherein the one or more electrochemical cells comprise electrolytic cells.

14. The fluidic system of claim 11, further comprising a modifying element at least partially enclosed within the electronic device.

15. The fluidic system of claim 14, wherein the modifying element modifies a property detected by the sensing device.

16. The fluidic system of claim 11, further comprising a light diffusing region, a surface-treated region, or a combination thereof in contact with a surface of the fluid enclosure.

17. The fluidic system of claim 14, further comprising an adhesive layer adapted to couple the modifying element to the fluid enclosure.

18. The fluidic system of claim 11, further comprising an infrared photosensor that determines a temperature of the fluid enclosure.

19. The fluidic system of claim 11, further comprising an encryption component in contact with the fluid enclosure.

20. The fluidic system of claim 19, wherein the encryption component includes information for system operability.

21. The fluidic system of claim 11, wherein the sensing device is attached to a printed circuit board.

22. The fluidic system of claim 11, further comprising at least one temperature sensor that communicates a temperature of one or more of the fluid enclosure and electronic device.

23. The fluidic system of claim 11, further comprising a controller that determines a mass of fluid within the fluid enclosure in response to a signal.

24. The fluidic system of claim 23, wherein the controller is adapted to adjust the mass of fluid in response to a signal.

25. The fluidic system of claim 23, wherein the signal comprises a temperature reading.

26. The fluidic system of claim 11, wherein the fluid enclosure comprises a flexible fluid enclosure.

27. The fluidic system of claim 11, wherein the fluid enclosure comprises a fluid enclosure with a flexible portion.

28. The fluidic system of claim 11, wherein the electronic device comprises a cellular phone, satellite phone, PDA, laptop computer, computer accessory, ultra mobile computer, display, personal audio or video player, medical device, television, transmitter, receiver, lighting device, flashlight or electronic toy.

29. The fluidic system of claim 11, wherein the fluid enclosure includes a fluid.

30. The fluidic system of claim 29, wherein the fluid comprises a gas.

31. The fluidic system of claim 29, wherein the fluid comprises hydrogen.

32. The fluidic system of claim 11, wherein the fluid enclosure includes a solid component.

33. The fluidic system of claim 32, wherein the solid component comprises a fluid storage material and is capable of occluding and desorbing hydrogen.

34. The fluidic system of claim 32, wherein the solid component comprises a composite hydrogen storage material.

35. The fluidic system of claim 32, wherein the solid component comprises a metal hydride.

36. The fluidic system of claim 32, wherein the solid component comprises clathrates, silicas, aluminas, zeolites, graphite, activated carbons, nano-structured carbons, microceramics, nano-ceramics, boron nitride nanotubes, palladium-containing materials or combinations thereof.

37. The fluidic system of claim 32, wherein the solid component comprises a flexible fluid enclosure.

38. The fluidic system of claim 32, wherein the solid component comprises a portion of a flexible fluid enclosure.

39. The fluidic system of claim 11, further comprising one or more valves between the one or more electrochemical cells and the fluid enclosure.

40. The fluidic system of claim 11, further comprising an interface for replenishing the fluid enclosure.

41. A method for monitoring a state of a fluid enclosure in an electronic device, comprising:
    providing an electronic device and a fluid enclosure, wherein the electronic device defines a cavity and the fluid enclosure is disposed at least partially within the cavity, and wherein the fluid enclosure is in fluid communication with at least one fuel cell located within the electronic device and the fluid enclosure contains a fuel for the at least one fuel cell;
    determining an observable property of the fluid enclosure, wherein the observable property is a distance between the fluid enclosure and a wall of the cavity and wherein the determination is made by measuring an amount of light detected by a photosensor and wherein the observable property is a function of the mass of a fluid contained within the fluid enclosure, wherein the change in distance indicates a proximity of the fluid enclosure to the photosensor.

42. The method of claim 41, further comprising determining the mass of the fluid contained within the fluid enclosure based on the observable property.

43. The method of claim 41, further comprising determining a state of charge of the fluid enclosure based on the observable property.

44. The method of claim 43, wherein determining comprises determining that the fluid enclosure is substantially full when the mass of the fluid contained within the fluid enclosure is above a predetermined threshold.

45. The method of claim 41, further comprising determining a temperature of the fluid enclosure based on the observable property.

46. The method of claim 41, further comprising authenticating the fluid enclosure in response to a permission-based observable property of the fluid enclosure.

47. The method of claim 41, further comprising rejecting the fluid enclosure in response to a permission-based observable property of the fluid enclosure.

48. The method of claim 41, further comprising preventing use of the fluid enclosure.

49. The method of claim 41, further comprising providing a signal in response to a change in a state of charge.

* * * * *